US005254260A

United States Patent [19]

Nielsen et al.

[11] Patent Number: 5,254,260

[45] Date of Patent: Oct. 19, 1993

[54] MEMBRANE INJECTOR

[75] Inventors: Kenneth A. Nielsen, Charleston; Jeffrey D. Goad, Barboursville; Lise Dahuron, Charleston, all of W. Va.

[73] Assignee: Union Carbide Chemicals & Plastics Technology Corporation, Danbury, Conn.

[21] Appl. No.: 881,651

[22] Filed: May 12, 1992

[51] Int. Cl.$^5$ .............................................. B01D 61/20

[52] U.S. Cl. ................................ 210/651; 210/500.26; 210/500.27

[58] Field of Search ........... 210/650, 651, 644, 500.26, 210/500.27; 366/152; 137/889, 13

[56] References Cited

U.S. PATENT DOCUMENTS

| | | | |
|---|---|---|---|
| 4,881,954 | 11/1989 | Bikson et al. | 55/16 |
| 5,105,843 | 4/1992 | Condron et al. | 137/889 X |
| 5,145,583 | 9/1992 | Angleraud et al. | 210/651 X |

*Primary Examiner*—Frank Spear
*Attorney, Agent, or Firm*—J. F. Leightner

[57] ABSTRACT

This invention relates to a method and system for proportionating, mixing, pressurizing, heating and supplying a coating formulation, wherein a microporous membrane injector/mixer located in the relevant section of the system so that undesirable precipitation of solid polymer from the coating formulation is subsequently avoided.

18 Claims, 5 Drawing Sheets

MEMBRANE INJECTOR

RELATED PATENT APPLICATIONS

This application contains subject matter related to U.S. Pat. No. 4,923,720, issued May 8, 1990; U.S. Pat. No. 5,027,742, issued Jul. 2, 1991; U.S. Pat. No. 5,105,843, issued Apr. 21, 1992 and U.S. Pat. No. 5,108,799, issued Apr. 28, 1992. This application also contains subject matter related to U.S. patent applications Ser. No. 413,517, filed Sep. 27, 1989, the disclosures of which are all incorporated herein by reference as if set out in full.

FIELD OF THE INVENTION

This invention, in its broader embodiment, pertains to the field of effectively mixing a proportionated plurality of fluids, particularly compressible and non-compressible fluids, more particularly coating compositions and supercritical fluids which are used as viscosity reducing diluents. More specifically, the present invention is directed to improved methods and apparatus for forming a completely mixed, sprayable coating composition mixture while substantially avoiding undesirable precipitation of solids and consequential system plugging. The resultant admixed properly Proportioned fluid mixture can then be sprayed onto a substrate to form the desired coated product.

BACKGROUND OF THE INVENTION

In essentially every process in which a mixture is prepared for a particular purpose, the constituents of that mixture usually need to be present in particularly proportioned amounts in order for the mixture to be effective for its intended use. In the aforementioned related patents and patent applications, the underlying objective is to reduce the amount of organic solvent present in a coating composition by the use of supercritical fluid, particularly, carbon dioxide. Understandably, with this objective in mind, it is generally desirable to utilize as much supercritical fluid as possible while still retaining the ability to effectively spray the liquid mixture of coating composition and supercritical fluid and also obtain a desirable coating on the substrate. Accordingly, here too, it is particularly preferred that there be prescribed proportionated amounts of supercritical fluid and of coating composition present in the liquid admixed coating formulation to be sprayed.

Generally, the preferred upper limit of supercritical fluid addition is that which is capable of being miscible with the coating composition. This practical upper limit is generally recognizable when the admixture containing coating composition and supercritical fluid breaks down from one phase into two fluid phases.

To better understand this phenomenon, reference is made to the phase diagram in FIG. 1 wherein the supercritical fluid is supercritical carbon dioxide fluid. In FIG. 1, the vertices of the triangular diagram represent the pure components of an admixed coating formulation which for the purpose of this discussion contains no water. Vertex A is solvent, vertex B is carbon dioxide and vertex C represents a polymeric material. It can be clearly seen in this Figure that the polymer and the solvent are completely miscible in all proportions, that the carbon dioxide and the solvent are likewise completely miscible in all portions, but that the carbon dioxide and the polymer are not miscible in any portion, and as such the carbon dioxide is a non-solvent for the polymer. The curved line BFC represents the phase boundary between one phase and two phases. The point D represents a possible composition of a coating composition in which supercritical carbon dioxide has not been added. The point E represents a possible composition of an admixed coating formulation after admixture with supercritical carbon dioxide. The addition of supercritical carbon dioxide fluid has reduced the viscosity of the viscous coating composition to a range where it can be readily atomized by passing it through an orifice such as in an airless spray gun. After atomization, a majority of the carbon dioxide vaporizes, leaving substantially the composition of the original viscous coating composition. Upon contacting the substrate, the remaining liquid mixture of the polymer and solvent component(s) will flow, i.e., coalesce, to produce a uniform, smooth film on the substrate. The film forming pathway is illustrated in FIG. 1 by the line segments EE'D (atomization and decompression) and DC (coalescence and film formation).

The amount of supercritical fluid, such as supercritical carbon dioxide, that can be mixed with a coating composition is generally a function of the miscibility of the supercritical fluid with the coating composition as can best be visualized by referring to FIG. 1.

As can be seen from the phase diagram, particularly as shown by arrow 100, as more and more supercritical carbon dioxide is added to the coating formulation, the compositions of the liquid admixed coating mixture approaches the two-phase boundary represented by line BFC. If enough supercritical carbon dioxide is added, the two-phase region is reached and the composition correspondingly breaks down into two fluid phases. Sometimes, it may be desirable to admix an amount of supercritical fluid which is even beyond the two phase boundary. Generally, however, it is not preferable to go much beyond this two phase boundary for optimum spraying performance and/or coating formation.

In addition to avoiding the two-phase state of the supercritical fluid and the coating composition, proper proportionation is also desirable to provide optimum spraying conditions, such as, formation of desired admixed viscosity, formation of desired particle size, formation of desired sprayed fan shape, and the like.

Accordingly, in order to spray liquid admixed coating formulations containing supercritical fluid as a diluent on a continuous, semi-continuous, and/or an intermittent or periodic on-demand basis, it is necessary to prepare such liquid admixed coating formulations in response to such spraying by accurately mixing a proportioned amount of the coating composition with the supercritical fluid. However, the compressibility of supercritical fluids is much greater than that of liquids. Consequently, a small change in pressure or temperature results in large changes in the density of the supercritical fluid.

The compressibility of the supercritical fluids causes the flow of these materials, through a conduit and/or pump, to fluctuate. As a result, when mixed with the coating composition, the proportion of supercritical fluid in the resulting admixed coating formulation also correspondingly fluctuates instead of being uniform and constant. Moreover, the compressibility of liquid carbon dioxide at ambient temperature is high enough to cause flow fluctuations to occur when using reciprocating pumps to pump and proportion the carbon dioxide with the coating composition to form the admixed coating formulation. This particularly occurs when the volume of liquid carbon dioxide in the flow path between the pump and the mixing point with the coating composition is too large. The fluctuation can be promoted or accentuated by any pressure variation that occurs during the reciprocating pump cycle.

The above-referred-to related patents and patent applications disclose apparatus for effectively supplying, feeding, measuring, proportionating, pressurizing, heating, and spraying an admixed coating formulation consisting of an admixture of a non-compressible coating composition comprised of a high concentration of one or more solid resins or polymers selected from a substantial list comprised of acrylics, amino, polyesters, alkyds; a variety of organic solvents, including water in some instances; suspended solids such as metallic flakes and other pigments; and a compressible supercritical fluid, such as supercritical carbon dioxide, as a viscosity reduction diluent.

Unexpectedly, however, operating problems were encountered when a nitrocellulose lacquer based coating composition was used with the methods and apparatus disclosed in the preferred embodiments of the aforementioned Applications. For reasons not fully understood with this coating composition, precipitation of solids occurred at the carbon dioxide injection and mixing point resulting in apparatus plugging.

After several runs with the nitrocellulose lacquer based coating composition, inspection of the apparatus revealed that the precipitate, in the form of a solid, partially to fully plugged the carbon dioxide feed injection point of a horizontally positioned 180° mixing tee, followed by additional plugging through the accumulation of said solids in the downstream static mixer connected to the injection point device.

As used herein and as is conventionally used in the art, a "180° mixing tee" is defined as a pipe or tubing tee in which two fluids are introduced opposing each other in the run of the tee with mixed flow exiting through the branch of the tee. On the other hand, a "90° mixing tee" is defined as a pipe or tubing tee in which one of the fluids is introduced through the branch of the tee to mix with the primary flow in the run of the tee with the mixture exiting through the run of the tee.

Clearly, what is needed is a simple method and apparatus to introduce a non-solvent, such as supercritical carbon dioxide, into a fluid containing a dissolved solid, such as a polymer or resin, for example. The method and apparatus should be such as to prevent the deposition of solids and the possible consequential plugging at the mixing point, and in other downstream apparatus, from the saturation induced precipitation, for example, of polymer(s) and resin(s) in coating compositions and admixed coating formulations by supercritical carbon dioxide fluid acting as a precipitant, as the coating composition fluid and the supercritical fluid liquid are introduced into the apparatus and are mixed and commingled therein.

In particular, methods and apparatus are needed wherein saturation of highly crystalline character polymer(s) and resins(s) does not occur through the contacting of said material by bubbles, plugs or slugs of the non-solvent, such as supercritical fluids, such as carbon dioxide, or even from stratified or annular flow patterns of the same, thereby avoiding precipitation and adherence of said solids within the apparatus and, accordingly, preventing eventually plugging in the apparatus.

The problems recognized cannot be practically and economically solved using wholly conventionally available devices.

The aforementioned U.S. Pat. No. 5,105,843 discloses a method and apparatus wherein a supercritical fluid, such as carbon dioxide, which may be a non-solvent for solids contained in a coating composition, is supplied to an isocentric low turbulence mixing apparatus such that it is interjected as a core of fluid within a flowing viscous coating composition fluid stream, which contains a precipitable solid polymer or resin.

While the methods and apparatus disclosed in U.S. Pat. No. 5,105,843 have successfully prevented the precipitation of dissolved solids and, therefore, plugging of the injector and downstream apparatus, when operating under conditions in which the non-solvent, such as carbon dioxide, is injected into the coating formulation more or less continuously, a problem has been discovered when the apparatus is used for intermittent operation over an extended period of time. During periods between operation, such as when the coating composition is not being sprayed, or when the spray apparatus is shut down over night, it has been found that the admixed coating formulation flows into the tube through which the carbon dioxide is injected, because the carbon dioxide has very low viscosity and low density so that it is readily displaced from the tube. Also, the carbon dioxide left inside the tube when the flow is shut off tends to dissolve into the admixed coating formulation. When the spray apparatus is started up, the carbon dioxide flow ejects most of the admixed coating formulation from the tube, but the interior wall of the tube remains wetted with a film of coating material. Over time, as carbon dioxide flows along the film, solvent is lost to the carbon dioxide flow, which causes the dissolved polymer to precipitate onto the tube wall as a solid layer. When the apparatus is again shut down, this polymer layer is then wetted with more admixed coating formulation, which precipitates more polymer when the unit is started up again. Therefore, as this process is repeated over time the layer of precipitated polymer on the tube wall becomes thicker and thicker until it eventually plugs the tube so that the apparatus must be shut down and the injector cleaned out. The accumulation of polymer on the tube wall increases the carbon dioxide velocity through the tube, so that it no longer matches the velocity of the coating formulation at the interface between the two as they leave the injector. The accumulated polymer also disrupts the desired knife edge at the end of the tube. Therefore, the interfacial flow of the two fluids becomes less laminar and more turbulent over time, which causes polymer to eventually begin to precipitate in the mixer and downstream apparatus.

Clearly, what is needed is a simple method and apparatus to introduce a non-solvent, such as supercritical carbon dioxide, into a fluid containing a dissolved solid, such as a polymer or resin, wherein precipitation of the dissolved solid is prevented not only during continuous operation but during the shut down and start up cycle. Preferably, such a method and apparatus would substantially eliminate the presence of a separate non-solvent phase that is in contact with the fluid containing the dissolved solid or that is in contact with the admixture of the two fluids, thereby substantially eliminating the interface across which solvent is lost, which causes precipitation of the dissolved solid. Preferably, the apparatus would contain no surface that is wetted by the non-solvent during operation and which could become wetted by the fluid containing the dissolved solid, or the admixture of the two fluids, during non-operation.

SUMMARY OF THE INVENTION

By virtue of the present invention, methods and apparatus have been discovered which substantially prevent the above-noted problems. Thus, by the simple but elegant membrane injector apparatus of the present invention, means have now been found in which fluids containing dissolved solid(s), including polymers and resins, may be mixed and commingled with non-solvent fluids, which may be a precipitant for one or more of said dissolved solids, without the deposition of said precipitated solids within the apparatus, thereby preventing the occurrence of plugging of the apparatus due to precipitation of said solids.

More specifically, by the apparatus of the present invention, means have now been provided which prevent coating compositions containing polymeric materials, particularly including highly crystalline types, such as nitrocellulose and the like, when mixed with a supercritical fluid that is a non-solvent for the polymeric material, from forming deposits within the apparatus from any precipitating solids or from the agglomeration of said precipitant, which may result in the occurrence of plugging of apparatus.

In particular, in accordance with the present invention, a supercritical fluid, such as carbon dioxide, which may be a non-solvent for solids contained in a coating composition, is supplied to the mixing apparatus such that it is interjected on a molecular level by diffusion and/or transport across a microporous membrane to a flowing coating composition fluid stream, which contains a precipitable solid polymer or resin. Preferably, but not necessarily, the supercritical fluid is injected such that it passes across the membrane and dissolves directly into the flowing coating composition fluid stream with minimal or no formation of a separate supercritical fluid phase. Therefore, minimal or no solvent is temporally lost into a separate supercritical fluid phase as the supercritical fluid dissolves, so precipitation is prevented.

This may be accomplished by means of a membrane injector which is preferably a cylindrical porous support tube that is lined with a thin microporous membrane on the inside face and is enclosed in a housing that enables the non-solvent, such as the supercritical fluid, to flow under pressure to the outside face of the tube along its length and the coating composition fluid stream to flow under pressure through the inside of the membrane lined tube. Alternatively, if desired, the cylindrical porous support tube may have the thin microporous membrane attached to the outside face, with the housing enabling the noncompressible fluid to flow through the inside of the tube and the coating composition fluid stream to flow along the outside face of the membrane outside of the tube.

Accordingly, the non-solvent, such as the supercritical fluid, passes through the membrane when the pressure of the supercritical fluid is greater than the pressure of the coating composition fluid stream. The molecules of non-solvent that emerge from the microporous membrane dissolve directly into the coating composition fluid stream that wets the surface of the membrane. Preferably, the ratio of the non-solvent flow rate to the coating composition fluid stream flow rate is kept at or below the solubility limit (at the temperature and pressure at which the two are mixed within the membrane injector/mixer) so that a separate non-solvent phase does not form within the coating composition, which could cause precipitation of the dissolved solids.

DETAILED DESCRIPTION OF THE INVENTION

As used herein, the phrases "coating formulation" or "coating composition" are understood to mean a typical, conventional coating composition which does not have any supercritical fluid admixed therewith. Also as used herein, the phrases "admixed liquid mixture" or "admixed coating formulation" are meant to include an admixture of a coating formulation with at least one supercritical fluid.

It is understood that while the following discussion will primarily focus upon providing a proportioned admixture of liquid mixture of a coating formulation and supercritical fluid, such as carbon dioxide, which is suitable for being sprayed onto a suitable substrate, without the apparatus being fouled, particularly in the mixing device due to precipitated solids, the present invention is in no way limited to this preferred embodiment. As is readily apparent from the foregoing discussion, the present invention encompasses the mixing of any plurality of fluids, one or more of which contains a dissolved solid (compounds below their melting point and as such are solid; polymers, and resins are examples), and likewise, one or more of which contains a non-solvent for said solid(s), to form a desired mixture for any intended subsequent use.

Because of its relevancy to the present invention, a brief discussion of supercritical fluid phenomena is warranted.

Supercritical fluid phenomenon is well documented, see pages F-62 to F-64 of the CRC Handbook of Chemistry and Physics, 67th Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein the "critical point" is the transition point at which the liquid and gaseous states of a substance merge into each other and represents the combination of the critical temperature and critical pressure for a given substance. The "critical temperature", as used herein, is defined as the temperature above which a gas cannot be liquified by an increase in pressure. The "critical pressure", as used herein, is defined as that pressure which is just sufficient to cause the appearance of two phases at the critical temperature.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing miscibility for some solutes. These variations are considered to be within the concept of a supercritical fluid. Therefore, as used herein, the phrase "supercritical fluid" denotes a compound above, at, or slightly below the critical temperature and pressure; i.e., the critical point of that compound.

Examples of such compounds which are well known to have utility as supercritical fluids are given in Table 1.

TABLE 1

| EXAMPLES OF SUPERCRITICAL SOLVENTS | | | |
|---|---|---|---|
| Compound | Boiling Point (C) | Critical Temperature (C) | Critical Pressure (atm) |
| Carbon Dioxide | −78.5 | 31.3 | 72.9 |
| Ammonia | −33.35 | 132.4 | 112.5 |
| Nitrous Oxide | −88.56 | 36.5 | 71.7 |
| Xenon | −108.2 | 16.6 | 57.6 |
| Krypton | −153.2 | −63.8 | 54.3 |
| Methane | −164.0 | −82.1 | 45.8 |
| Ethane | −88.63 | 32.28 | 48.1 |
| Ethylene | −103.7 | 9.21 | 49.7 |
| Propane | −42.1 | 96.67 | 41.9 |
| Pentane | −36.1 | 196.6 | 33.3 |
| Methanol | 64.7 | 240.5 | 78.9 |
| Ethanol | 78.5 | 243.0 | 63.0 |
| Isopropanol | 82.5 | 235.3 | 47.0 |
| Chlorotrifluoromethane | −31.2 | 28.0 | 38.7 |
| Monofluoromethane | −78.4 | 44.6 | 58.0 |

Due to the low cost, environmental acceptability, non-flammability and low critical temperature of carbon dioxide, supercritical carbon dioxide fluid is preferably used with the coating compositions. For many of the same reasons, nitrous oxide ($N_2O$) is a desirable supercritical fluid for admixture with the coating compositions. However, any of the aforementioned supercritical fluids and mixtures thereof are to be considered as being applicable for use with the coating formulations.

The miscibility of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

Due to the miscibility of the supercritical fluid with the coating formulations, a single phase liquid mixture is able to be formed which is not only capable of being sprayed by airless spray techniques, but which forms the desired feathered spray pattern.

The present invention is not narrowly critical to the type of coating compositions that can be sprayed provided that there is less than about 30% by weight of water in the solvent fraction of the formulation. Thus, essentially any coating formulation meeting the aforementioned water limit requirement which is conventionally sprayed with an airless spray technique may also be sprayed by means of the methods and apparatus of the present invention.

Generally, such coating formulations typically include a solids fraction containing at least one component which is capable of forming a coating on a substrate, whether such component is an adhesive, a paint, lacquer, varnish, chemical agent, lubricant, protective oil, non-aqueous detergent, or the like. Typically, at least one component is a polymer component which is well known to those skilled in the coatings art.

Generally, the materials used in the solids fraction of the present invention, such as the polymers, must be able to withstand the temperatures and/or pressures which are involved when they are ultimately admixed with the at least one supercritical fluid. Such applicable polymers include thermoplastic or thermosetting materials or may be cross linkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound that may be contained in the solids fraction, conventional additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the coating formulation to be sprayed by methods of the present invention.

In addition to the solids fraction, a solvent fraction is also typically employed in the coating formulations whether they be an adhesive composition or a paint, lacquer, varnish, or the like, in order to act as a vehicle in which the solid fraction is transported from one medium to another. As used herein, the solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating formulation for application by airless spray techniques is conventional and well known to those skilled in the art. In general, up to about 30% by weight of water, preferably up to about 20% by weight, may also be present in the solvent fraction provided that a coupling solvent is also present in the formulation. All such solvent fractions are suitable in the present invention.

A coupling-solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used include, but are not limited to, ethylene glycol ethers; propylene glycol ethers; chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethanol. Also included are lactams such as n-methyl-2-pyrrolidone, and cyclic ureas such as dimethyl ethylene urea.

When water is not present in the coating formulation, a coupling solvent is not necessary, but may still be employed. Other solvents, particularly active solvents, which may be present in typical coating formulations and which may be utilized include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dandge, et al., *Ind. Eng. Chem.* (Product Research and Development) 24, 162, 1985 and Francis, A. W., J. *Phys. Chem.* 58, 1099, 1954.

Of course, there are solvents which can function both as coupling solvents as well as active solvents and the one solvent may be used to accomplish both purposes. Such solvents include, for example, butoxy ethanol, propoxy ethanol and propoxy 2-propanol. Glycol ethers are particularly preferred.

Suitable additives that are conventionally present in coating formulations that are intended for spray application may also be present: such as, curing agents, plasticizers, surfactants, and the like.

BRIEF DESCRIPTION OF THE DRAWINGS

Referring now to FIG. 2, the membrane injector/-mixer of the present invention is shown symbolically and schematically as it is typically located in the relevant portion of the spray coating apparatus. A compressible fluid, which is a non-solvent for the dissolved solid, such as a polymer, contained in the coating composition, which is to be proportionately mixed with a non-compressible fluid containing said dissolved solid to form a desired admixture, is introduced from a supply source (not shown) to pumping means 200 via line 101. The compressible fluid is then pumped via line 102 to optional pressure regulator 205 and then via line 120 through meter 210 for measuring the mass flow rate of the compressible fluid. The pressure of the compressible fluid in line 108 may be used to control the pressure at the downstream application, such as the spray pressure at a spray gun. The pressure in line 108 may be controlled by adjusting the outlet pressure from pumping means 200 or by using optional pressure regulator 205, in which case pump 200 is set to deliver a pressure above the desired delivery pressure from regulator 205.

Figure 1:
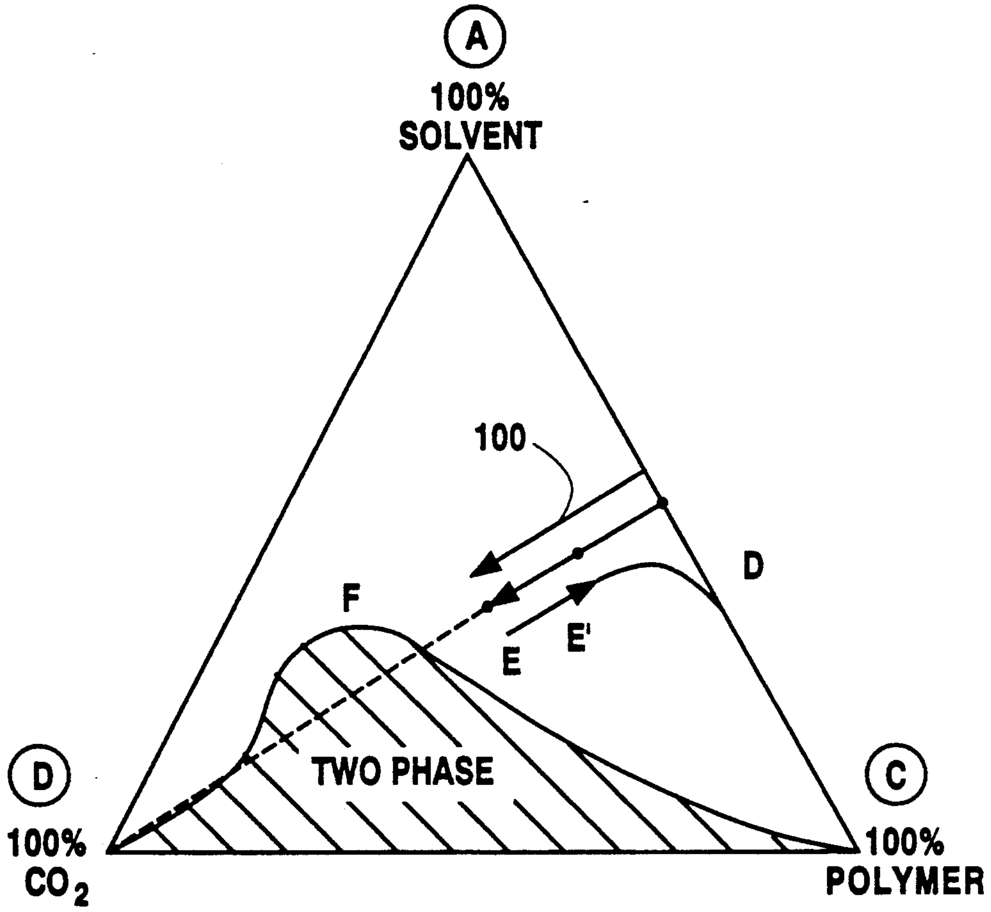
FIG. 1 is a phase diagram of a supercritical carbon dioxide fluid spray coating.

In the broad embodiment of the present invention, pumping means 200 is not narrowly critical to the present invention. It may comprise any kind of a pump that is capable of pumping a compressible fluid and it may be driven by any conventional means, such as an air driven pump. For example, a conventional reciprocating pump which is well known to those skilled in the art is quite suitable. For some applications, preferably the pump is capable of pumping on demand.

Mass flow rate measuring meter 210 may comprise any conventionally available mass flow rate measuring device such as a Micro Motion Model D mass flow meter manufactured by Micro Motion Inc. of Boulder, Colo. Generally, such mass flow rate measuring devices are known as coriolis meters. In contrast to most flow metering techniques which measure fluid volume, the measuring meter 210 measures mass flow. Relying on volume as a meaningful measuring device is inaccurate at best when dealing with compressible fluids. The volume of a compressible fluid may change, sometimes radically, in response to changing fluid temperature, pressure, or composition. One property of a fluid which is unaffected by environmental conditions is its mass. It is this characteristic of the compressible fluid which is desirably measured and from which the rate of flow of the non-compressible fluid is controlled.

The mass flow rate measured by measuring meter 210 is electronically transmitted by an electronic signal to a receiving device 220 via dotted line 103 which in turn sends out an electronic signal through dotted line 104 to electronic ratio controller 230. All of these electronic sensors and receivers are well known to those skilled in the art and are not narrowly critical to the present invention.

Simultaneously, non-compressible fluid is supplied via line 105 to the pumping means 240. Preferably, pumping means 240 is a positive displacement pump and even more preferably a precision gear pump, which are known to those skilled in the art. Such pumps are capable of delivering substantially precise amounts of the non-compressible fluid on demand.

The ratio controller 230 contains logic circuitry which can be programmed to accept the electronic signal from device 220 and in turn generates a signal through dotted line 106 which controls the speed at which pump 240 operates. Correspondingly, the amount of non-compressible fluid that leaves pump 240 and enters line 107 is precisely controlled to a predetermined ratio relative to the amount of compressible fluid measured and passed into line 108.

Preferably, but not necessarily, the non-compressible fluid leaving pumping means 240 through line 107 is then passed into measuring device 250 to measure the actual flow rate of the non-compressible fluid. The flow rate that is measured may be on a volumetric or mass flow rate basis. Such a measuring device may comprise, for example, a precision gear meter such as is available from AW Company (Racine, Wis.). The type of measuring device is not narrowly critical to the present invention. Since the material that is being measured is substantially non-compressible, its density will not materially vary over time. Accordingly, although what is being measured by this measuring device may be a volumetric flow rate, its accuracy here is quite acceptable in order to obtain an accurately proportioned final mixture.

The flow rate measured by measuring device 250 generates a flow feedback signal which is electronically received by the ratio controller 230 through dotted line 109. The controller compares the actual flow rate that is measured by measuring device 250 with the required flow rate needed to provide the desired ratio of non-compressible and compressible fluids based on its preset programming and makes any adjustments needed to the speed of pump 240 so as to obtain that required flow rate.

The non-compressible fluid leaving through line 110 and the compressible fluid leaving through line 108 enter membrane injector means 260 via their respective lines in accordance with the present invention. Desirably, check valves (not shown) may be provided in each of lines 108 and 110 so as to prevent any backmixing. Recycle fluid in the circulation loop (not shown, but which loop may be comprised of static mixers, heaters, an accumulator, a sight glass, a density measuring device and the spraying means) comprised of the admixture of compressible and non-compressible fluids may be supplied via line 113 to recycle pumping means 270. Preferably, pumping means 270 is a positive displacement pump and even more preferably a precision gear pump, which are known to those skilled in the art.

Membrane injector/mixer 260 comprises any effective microporous membrane mixing device capable of merging the two fluids without causing precipitation of solids either within the membrane injector means 260, causing plugging therein, and/or downstream of injector means 260, causing plugging of downstream apparatus connected via line 112. A typical membrane injector/mixer 260 of the present invention comprises a microporous membrane having two faces, an inlet face and an outlet face, contained in a housing means that does not allow fluid communication between the two faces other than by passage of compressible fluid across the membrane. Preferably the membrane is structurally supported by a porous support that is in contact with the inlet face. The membrane may also be supported, if desired, by a suitable means on the outlet face, such as a thin support grid. Preferably, the support means does not prevent active fluid flow contact of the non-compressible fluid with outlet face. The non-compressible fluid (containing the dissolved polymer) enters the membrane injector means 260, via line 110, through an inlet in the housing means at pressure $P_1$ and flows through a first passageway, in fluid contact with the outlet face of the membrane, to an outlet in the housing means, through which it exits at pressure $P_2$ and temperature $T_2$, via line 115. The compressible fluid (a non-solvent for the polymer dissolved in the coating composition) enters, via line 108, through an inlet in the housing means at pressure $P_3$ that is greater than pressure $P_1$ and flows into a second passageway in fluid contact with the inlet face of the membrane. Due to the greater pressure at the inlet face of the membrane, the compressible fluid flows and/or diffuses across the membrane to the outlet face, where it dissolves into the non-compressible fluid in contact with that face.

Figure 2:
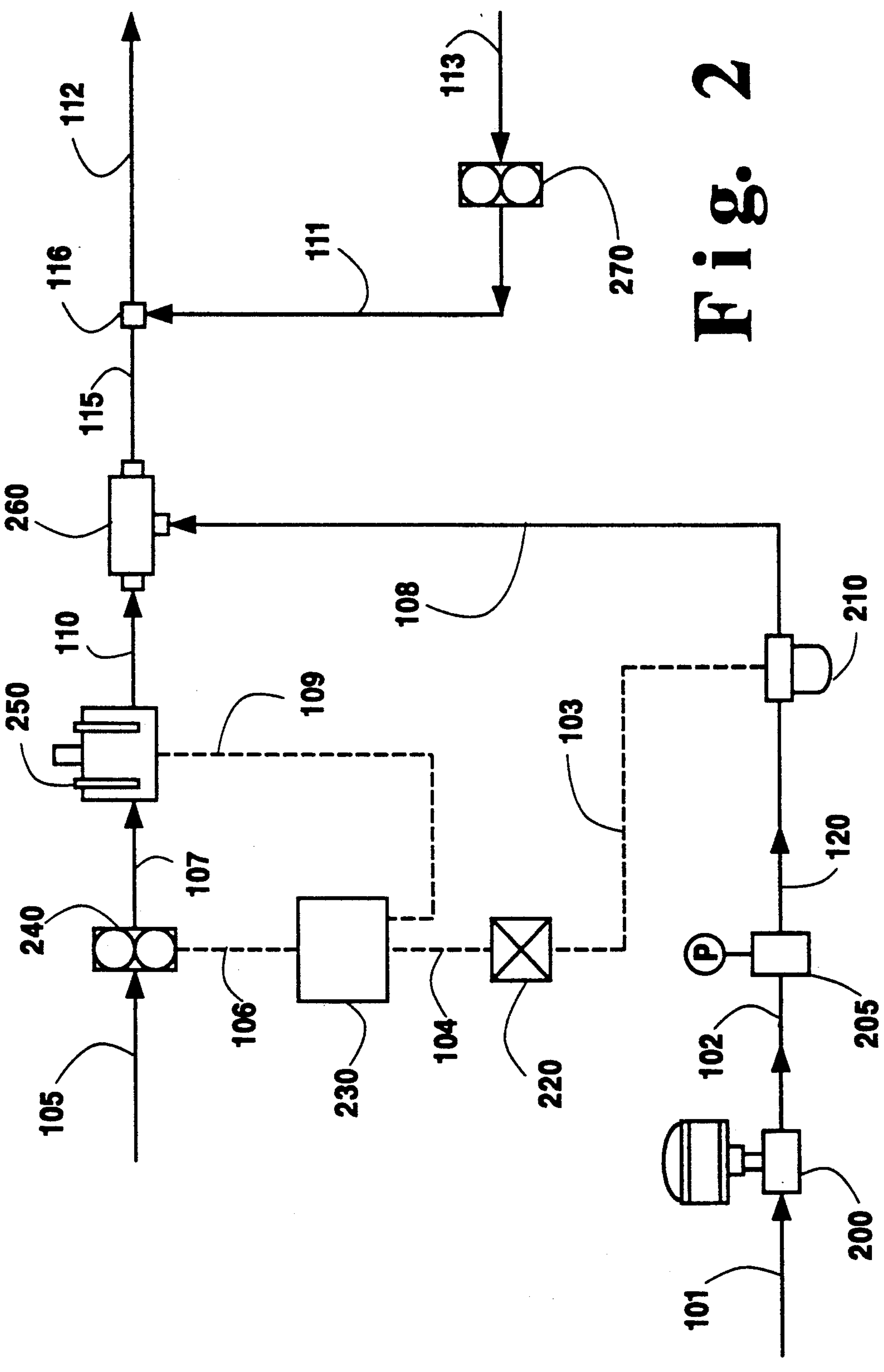
FIGS. 2 and 3 are schematic drawings of systems of the invention incorporating a microporous membrane.

The desired, accurately proportioned mixture of compressible and non-compressible fluid leaves the membrane injector means 260 via line 115 for additional processing or final use in the downstream application, as required (not shown). FIG. 2 shows the admixture from line 115 being mixed at mix point 116 with recycle fluid 111 from the circulation loop. Preferably, line 112 is connected to a static mixer to provide a well mixed flowing stream. If desired, the admixture from line 115 may flow directly to the downstream application, such as a spray apparatus, for use without being mixed with recycled fluid, that is, single-pass flow may be used with no circulation loop. In FIG. 2, the mixture of feed and recycled fluids in line 112 flows to the downstream application, such as a spray apparatus for spraying.

In operation, when flow is initiated in line 112 by the downstream application, such as spraying from a spray gun, the pressure in line 112 drops below its static pressure, which causes a pressure drop to be established across the membrane in membrane injector means 260, which in turn causes compressible fluid to flow and/or diffuse through the membrane from line 108 and hence line 120. Pressure drop in line 120 causes pressure regulator 205 to allow flow from line 102 at whatever rate is necessary to maintain the desired downstream pressure, which in turn activates pumping means 200. The flow of compressible fluid through measuring means 210 causes pumping means 240 to be activated by ratio controller 230 and to pump non-compressible fluid through line 110 at the rate required to obtain the desired flow ratio. When flow through line 112 is stopped by the downstream application, the pressure rises to its static value, which corresponds to the pressure set by optional pressure regulator 205 or to the stall pressure set at pumping means 200, if regulator 205 is not used. Therefore the pressure drop across the membrane in membrane injector 260 drops to zero and flow ceases through line 108. This in turn causes the ratio controller to stop pumping means 240 and hence the flow through line 110 stops.

In order to prevent formation of a separate compressible fluid phase in membrane injector 260, which could cause precipitation of dissolved solids, the flows rates through lines 108 and 110 into membrane injector 260 are controlled by ratio controller 230 such that the admixture of compressible fluid and non-compressible fluid in line 115 contains little undissolved compressible fluid. Preferably, the admixture of compressible fluid and non-compressible fluid contains less than about 5 percentage points by weight of compressible fluid above the solubility limit for the exit pressure $P_2$ and temperature $T_2$ from membrane injector 260 under steady flow conditions. More preferably, the admixture contains less than about 2 percentage points by weight of compressible fluid above the solubility limit. Most preferably, the amount of compressible fluid in the admixture is at or below the solubility limit at exit pressure $P_2$ and temperature $T_2$ of membrane injector 260 under steady flow conditions.

The flow rate of compressible fluid across the microporous membrane in membrane injector 260 depends on the membrane area, the porosity of the membrane, the pore size, the membrane thickness, and the pressure drop across the membrane. For a membrane of given porosity, pore size, and thickness, a large enough membrane area is used to give a pressure drop across the membrane that does not exceed the recommended mechanical design limits of the membrane and its support structure at the steady flow conditions required by the downstream application. It is also preferable that the total membrane area be sufficiently large that the required flow rate of compressible fluid through the membrane for a given application is obtained without requiring a substantial drop in downstream application pressure to occur in order to obtain the required flow rate. For example, in spray applications, it is desirable that the spray pressure at steady flow not be substantially below the static pressure with no flow. That is, it is desirable that the pressure in line 115 not drop substantially below the controlled pressure in line 108 when spraying. In general, preferably the pressure drop across the membrane is below about 400 psig. More preferably, the pressure drop across the membrane is below about 200 psig. For a given desired pressure drop, the total membrane area is determined by the flow rate required by the particular application.

If desired, to minimize the pressure swing in the downstream application when the flow is turned on and off, a control valve may be used in line 108. The valve is shut whenever the flow in line 112 is turned off and opened whenever the flow in line 112 is turned on. For example, the valve may be opened by a signal sent to the valve whenever flow to the downstream application is activated, such as activating a spray gun and spraying material. Then the pressure in line 120 can be maintained sufficiently above the desired application pressure to give the desired flow rate of compressible fluid through the membrane.

The application pressure may also be kept constant by relocating circulation pump 270 to line 112 and installing a pressure regulator in line 113 in FIG. 2. The pressure regulator is set to maintain the application pressure at the desired level. The circulation pump then boosts the reduced pressure in line 115 caused by the pressure drop across the membrane up to the application pressure.

In the mixing method shown in FIG. 2, the non-compressible fluid containing dissolved solids, as supplied by line 105, may have a high viscosity until it is diluted by the compressible fluid in the membrane injector. High viscosity will generally cause the non-compressible fluid to enter the membrane injector in laminar flow. Therefore, it is desirable for the compressible fluid to have high diffusivity through the non-compressible fluid, so that the compressible fluid that dissolves into the non-compressible fluid at the membrane surface will readily diffuse from the surface into the interior of the flow, so that the interface concentration will remain below the solubility limit and a separate phase will not form in substantial amount. To aid mixing within the laminar flow, mechanical mixing devices, such as a static mixer, are preferably used within the membrane injector to promote fluid flow from the interior of the fluid to the membrane surface and from the membrane surface to the interior. As compressible fluid dissolves into the non-compressible fluid, the viscosity of the admixture drops and hence mixing improves as the concentration of compressible fluid approaches the solubility limit near the exit of the membrane injector. Turbulence promotion devices may also be used at the inlet to the membrane injector or within it to promote fluid mixing. The non-compressible fluid may also be heated prior to entering the membrane injector in order to reduce its viscosity to aid mixing. Preferably, the non-compressible fluid has a viscosity below about 10,000 centipoise at a temperature of 25° Celsius. More preferably, the non-compressible fluid has a viscosity below about 5,000 centipoise at a temperature of 25° Celsius. Most preferably, the non-compressible fluid has a viscosity below about 3,000 centipoise at a temperature of 25° Celsius.

The membrane injector is preferably designed so that the pressure drop of the non-compressible fluid as it flows through the membrane injector does not exceed the recommended mechanical design limits of the membrane and its support structure. Pumping means 240 will automatically raise the inlet pressure in line 110 to give the required flow rate through the membrane injector. Preferably, the inlet pressure of the non-compressible fluid (line 110) remains below the inlet pressure of the compressible fluid (line 108). More preferably, the pressure drop of the non-compressible flow through the membrane injector is less than half of the pressure drop of the compressible fluid through the microporous membrane. Most preferably, the pressure drop of the non-compressible flow through the membrane injector is less than one quarter of the pressure drop of the compressible fluid through the microporous membrane.

Figure 3:
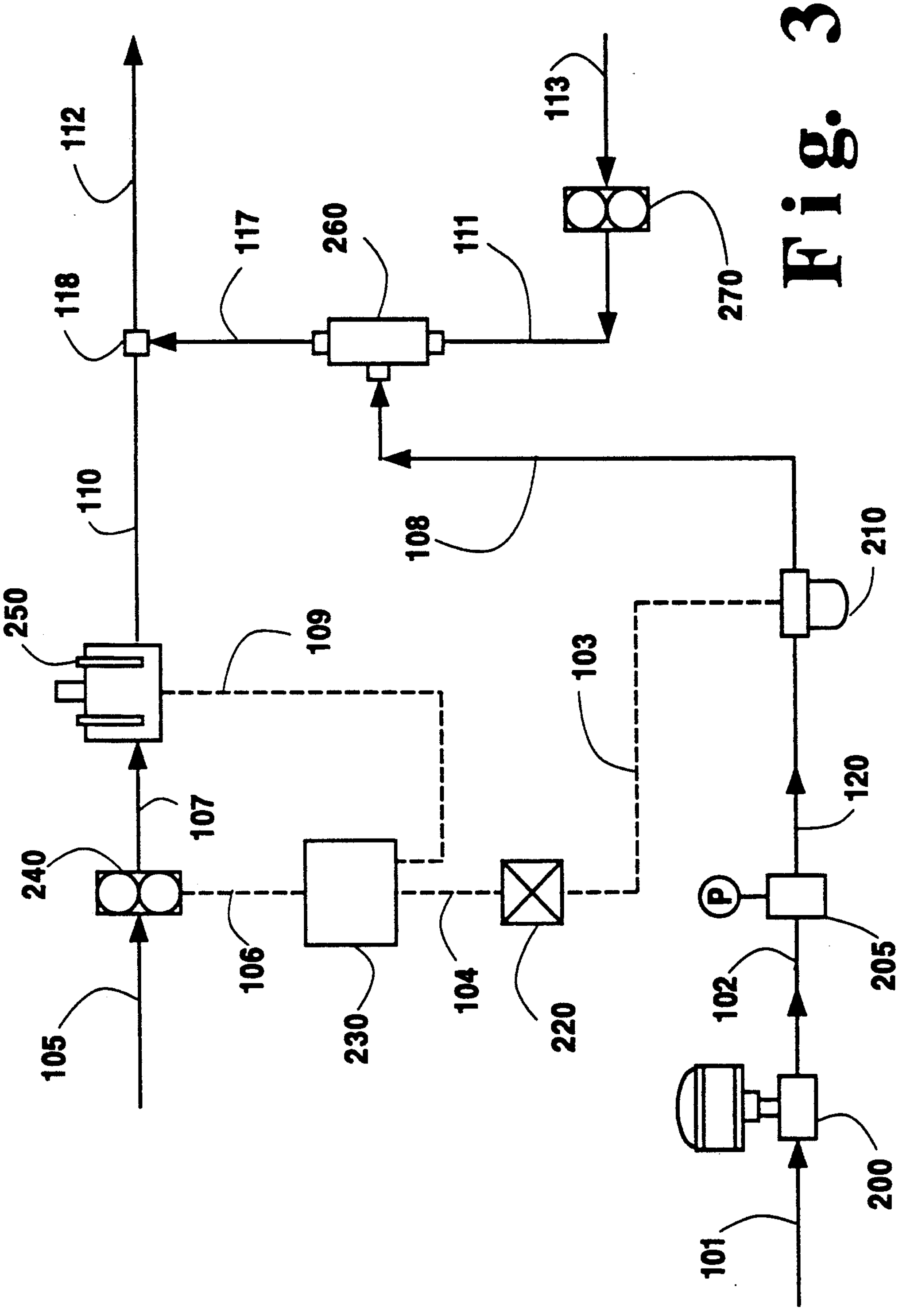

A more preferred mixing method is shown in FIG. 3, in which the same reference numerals are used as in FIG. 2 to identify like elements. In this method, the compressible fluid in line 108 is injected inside membrane injector 260 into recycle fluid 111 from the circulation loop. Because the recycle fluid contains an admixture of compressible fluid and non-compressible fluid, it has much lower viscosity than the non-compressible fluid in line 110. The flow rate through the membrane injector is also continuous and has much higher velocity than in the system shown in FIG. 2, because of the continuous circulation by circulation pump 270. Therefore, agitated or turbulent flow is more readily obtained within the membrane injector, so that good mass transfer of compressed fluid occurs from the outlet face of the membrane to the interior of the recycle fluid. Also, little pressure drop occurs as the admixture flows through the membrane injector. The non-compressible fluid is added separately at mix point 118 to the recycle fluid stream 117 from the membrane injector. Mix point 118 may be a standard mixing tee as previously described. Preferably a static mixer (not shown) is used in line 112 just downstream of mix point 118.

To be able to flow and/or diffuse readily through the membrane, it is preferable that the components of the compressible fluid have a sufficiently low molecular weight so that the molecules have sufficiently small size and sufficiently high diffusivity to penetrate through the membrane pores without becoming trapped within the membrane. Therefore, preferably the components of the compressible fluid have a molecular weight less than about 100. More preferably, the components of the compressible fluid have a molecular weight less than about 70. Most preferably, the components of the compressible fluid have a molecular weight less than about 50.

The compressible fluid preferably consists of components that are a liquid, a gas, or a supercritical fluid at the temperature and pressures at which the compressible fluid passes through the membrane. More preferably, the compressible fluid consists of components that are a liquid, a gas, or a supercritical fluid at the standard conditions of 0° Celsius temperature and one atmosphere pressure (STP). Most preferably, the compressible fluid consists of components that are gases at standard conditions of 0° Celsius temperature and one atmosphere pressure (STP).

The compressible fluid should consist of components that have high solubility in the non-compressible fluid at the temperature $T_2$ and pressure $P_2$ at the outlet from the membrane injector. Preferably, the compressible fluid has a solubility in the non-compressible fluid of at least about 10 percent by weight. More preferably, the compressible fluid has a solubility in the non-compressible fluid of at least about 15 percent by weight. Most preferably, the compressible fluid has a solubility in the non-compressible fluid of at least about 20 percent by weight.

The compressible fluid may be heated prior to entering the membrane injector in order to increase its flow and/or diffusion rate across the membrane.

To prevent the solids dissolved in the non-compressible fluid from entering significantly into the pores of the membrane, which could plug the membrane pores, it is preferable that the dissolved solids have a sufficiently high molecular weight. Preferably, the dissolved solids have a molecular weight above about 1000. More preferably, the dissolved solids have a weight average molecular weight above about 2000. Still more preferably, the dissolved solids have a weight average molecular weight above about 5000. Most preferably, the dissolved solids have a weight average molecular weight above about 10,000.

The pores of the membrane must be sufficiently large to allow the compressible fluid to readily flow and/or diffuse through the membrane but be sufficiently small to prevent the dissolved solids in the non-compressible fluid from entering the pores. Preferably, the membrane has an average pore size in the range of about 20 Angstroms to about 500 Angstroms. More preferably, the membrane has an average pore size in the range of about 40 Angstroms to about 200 Angstroms. Most preferably, the membrane has an average pore size in the range of about 50 Angstroms to about 100 Angstroms.

The membrane should be constructed of material that is compatible with the non-compressible fluid and compressible fluid used. The membrane may be a polymeric material that is resistant to the solvents in the non-compressible fluid and to the compressible fluid. Preferred membrane materials are sintered metal and ceramic materials made from relatively uniform particles that give a uniform pore size. The most preferred membrane materials are sintered gamma alumina and zirconia.

The membrane and support structure may be constructed having a graduation of particle size from large to small from the inlet face to the outlet face to give a graduation of pore sizes. This may be done continuously or as two or more layers having progressively smaller sintered particle sizes to give layers with finer and finer pore size as the layer becomes closer to the outlet face. For example, support and membrane structure may consist of 1) a porous support having a relatively large pore size, such as 10,000 Angstroms, to provide rapid flow and/or diffusion of the compressible fluid through the support to the membrane; 2) a thinner inner membrane layer having an intermediate pore size, such as 1000 Angstroms, may be bonded to the porous support; and 3) a thin outer membrane layer having a small pore size, such as 100 Angstroms, may be bonded to the inner membrane layer and be the outlet face of the membrane.

The membrane should be thin enough so that the compressible fluid can readily flow and/or diffuse through the membrane but it should be thick enough to have sufficient mechanical strength to withstand the pressure drop across it. The thickness used for any given application will depend upon properties of the membrane, the compressible fluid, and the non-compressible fluid.

The geometrical design of the membrane and the support structure in the membrane injector is not narrowly critical to the practice of the present invention provided that it 1) provides sufficient mechanical integrity for the pressure drop utilized across the membrane, 2) that it effectively supplies compressible fluid to the inlet face of the membrane, and 3) that it effectively contacts the non-compressible fluid with the outlet face of the membrane so that the compressible fluid that passes across the membrane readily dissolves into the non-compressible fluid, thereby preventing precipitation of the dissolved solids within the membrane or in the downstream application.

For example, the membrane may consist of a flat sheet supported on the inlet face by a porous support plate to which it is bonded or attached and on the outlet face by a support grid. The membrane is enclosed in a housing that feeds compressible fluid under pressure to the inlet face of the membrane and that feeds non-compressible fluid to the outlet face of the membrane. The membrane may be square or rectangular and have the non-compressible fluid flow across the outlet face from one end to the other end. Or the membrane may be circular with the non-compressible fluid fed to the center of the membrane outlet face, from which it flows radially outward to be collected along the circumference. The membrane injector may contain several such constructions that operate in parallel or in series.

Preferably, the membrane is in the form of a thin tubular layer that lines the interior of a tubular porous support to which it is bonded or attached. The tubular porous support is enclosed in a housing that feeds compressible fluid under pressure through the porous support to the inlet face of the membrane. The non-compressible fluid with dissolved solids, or preferably recycled admixture of compressible fluid and non-compressible fluid, flows through the interior of the membrane tube, where it is contacted with the compressible fluid that flows and/or diffuses from the membrane outlet face.

Alternatively, if desired, the tubular porous support may have the membrane attached to the outside face. The housing feeds the compressible fluid under pressure through the inside passageway of the tube. The non-compressible fluid flows along the outside face of the membrane outside of the tube.

As discussed earlier, the present invention is particularly applicable, although certainly not limited to, being able to prepare an admixed liquid mixture of an accurately proportioned amount of supercritical fluid, particularly supercritical carbon dioxide, with a coating composition.

Figure 4:
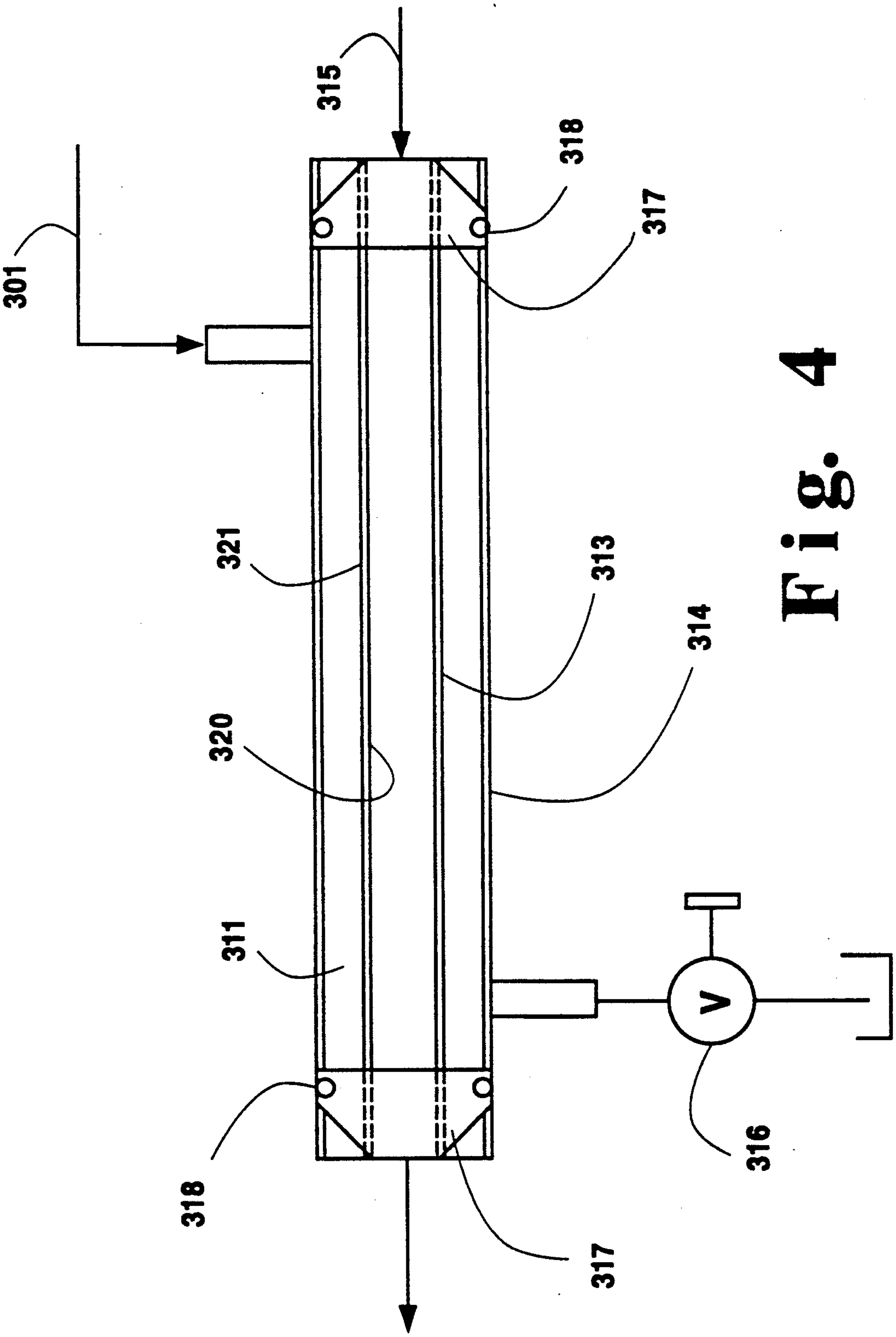
FIG. 4 is a cross-sectional view of one embodiment of the microporous membrane.

FIG. 4 illustrates a cross-sectional view of a preferred embodiment of the membrane injector means 260 that can be used to effect the desired merging of the non-solvent compressible fluid, the incompressible coating composition fluid, and, if desired, the recycle admixed coating formulation fluid, without resulting in the undesirable solids formation and plugging of the apparatus therefrom. It is understood that the scope of the present invention also includes other membrane injector designs which are capable of accommodating the merging of the non-solvent compressible fluid and the coating composition alone and the merging of the non-solvent compressible fluid and the coating composition with recycled admixed coating formulation without solids formation within the device which may cause plugging of the said merging devices and other contiguous devices.

The apparatus membrane illustrated in FIG. 4, such as a Membralox® Ultrafilter ceramic membrane, has a tubular porous support with a thin membrane bonded to the inside surface. The support and membrane are made from sintered gamma alumina or zirconia particles, with relatively large particles forming the support and relatively small particles, in one or more layers, forming the ceramic membrane. The gaps between the non-porous alumina or zirconia crystals constitute the pores. This provides very controlled and regular distribution of pore sizes. The assembly illustrated in FIG. 4 consists of an open-ended stainless steel tubular housing 314 which holds the tubular ceramic support and membrane 313. Ferrules 317 are attached to both ends of the tubular ceramic support to position the supported membrane along the centerline of the housing. The ferrules are sealed to the housing using o-rings 318. Compressible fluid enters the annular space 311 between the housing 314 and the supported membrane 313 through feed port 301. Valve 316 is closed to prevent flow from the annular space 311 other than through the membrane 313 from the inlet face 321 to the outlet face 320. The non-compressible fluid, or recycled admixture of compressible fluid and non-compressible fluid, enters the supported membrane 313 tube through 315 and flows through the interior of the supported membrane tube in contact with the outlet face 320 of the membrane. The compressible fluid flows and/or diffuses through the membrane support and membrane layer 313 and dissolves into the non-compressible fluid flowing along its outlet face 320. If desired, a static mixer may be inserted inside the tubular supported membrane 313 along its length to promote active mixing from the membrane surface into the bulk flow. The total surface area of the ceramic membrane and the pore size are critical for determining flow rate capability. Preferably, the tubular supported membrane has an inside diameter of about 0.05 inch to about 1 inch. More preferably, the tubular membrane has an inside diameter of about 0.1 inch to about 0.7 inch. Most preferably, the tubular membrane has an inside diameter of about 0.2 inch to about 0.5 inch.

Figure 5:
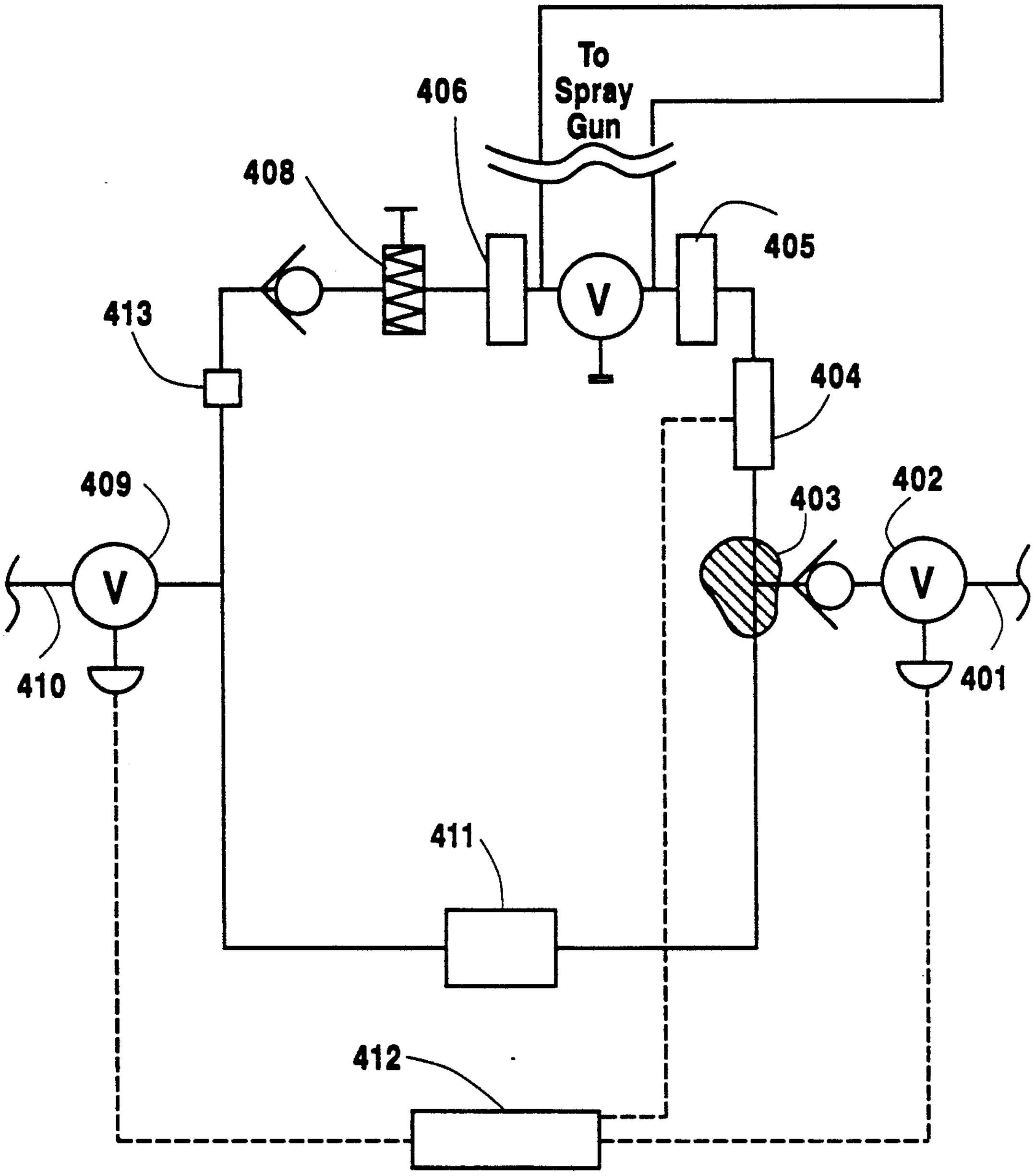
FIG. 5 is a schematic representation of a preferred mode of using the microporous membrane.

FIG. 5 shows schematically a preferred mode of using the membrane injector/mixer shown in FIG. 4 to inject compressible carbon dioxide fluid into a non-compressible coating formulation containing dissolved polymer solids. The apparatus functions to proportion compressible fluid, such as carbon dioxide, and a non-compressible fluid, such as a coating formulation, to a desired concentration. The mode of use for the ceramic membrane in FIG. 5 is to inject carbon dioxide across the membrane into the flow stream of the admix fluid as illustrated in FIG. 3. The apparatus is a Nordson Spray Unit manufactured by Nordson Corporation of Westlake, Ohio for spray processes of the type described herein. The Unit functions via a feedback system as opposed to a feed forward metering system.

The Nordson Unit has a carbon dioxide feed line, a coating feed line, a circulation loop, and an electronic control system which all function to generate and maintain pressures, temperatures, and desired concentrations of carbon dioxide in a coating. The system operations are initiated from coating that is pumped into the circulation loop by a pump at a desired pressure. This coating is then circulated by a dual reciprocating piston pump 411 through a back pressure regulator 408 to reduce the pressure to feed the suction side of the circulation pump 411. This allows control of flow rates and pressures within the circulation loop. Also located in the loop are heaters 405 and 406 to maintain constant temperature control of the system. As this coating is circulated, it passes through a capacitance cell 404 which measures the capacitance of the fluid in the loop and hence the concentration of carbon dioxide in the admixture. This capacitance cell provides feedback to a controller 412 which operates and controls solenoid valves 409 and 402 for carbon dioxide feed and coating feed, respectively. The controller 412 allows the operator to enter a desired capacitance setpoint into the controller program that will be maintained in the loop. Carbon dioxide when mixed with the coating formulation will change the capacitance. This relative change has been scaled to Provide the necessary amounts of carbon dioxide for the intended applications. The controller 412 will open the solenoid valve 402 to allow carbon dioxide to flow from carbon dioxide feed line 401 into the circulation loop by result of a pressure differential maintained between the carbon dioxide feed system and the circulation loop. As the carbon dioxide flows into the loop across the membrane in membrane injector, shown symbolically as 403 in FIG. 5, it mixes readily with the admixed fluid being circulated through the ceramic membrane tube. The newly mixed material then passes through the capacitance cell 404 and is measured. This feedback is provided to the controller 412 which in turn closes the carbon dioxide solenoid valve 402 when the entire loop contents are at the desired conditions. Coating will enter the loop through a mixing tee only on demand for pressure as required by the controller. The flow of the coating is also a result of a pressure differential maintained between the loop and the coating feed system. The required pressure for the circulation loop area down stream of the back-pressure regulator 408 is entered into the controller. This pressure will be maintained by the controller opening and closing a solenoid valve 409 from feedback received from a pressure transducer 413. When this new material enters the loop from line 410 the capacitance will change and the carbon dioxide feed process will repeat continuously to maintain the capacitance setpoint.

As another embodiment of the present invention, one or more of the membrane injectors may be installed in parallel with the primary injector to provide a back-up device that could easily, either manually or through electric signals sent to standard process control devices, be activated in the unlikely event that the primary injector becomes inoperative due to plugging, or from other unexpected, unforeseen events.

An automatic solvent flushing method and apparatus may be utilized to flush the membrane with a minimal amount of flush solvent to prevent precipitation induced blockage of the membrane pores by dissolving any unexpected incipient solids build-up with an automatically controlled intermittent solvent flush.

While preferred forms of the present invention have been described, it should be apparent to those skilled in the art that methods and apparatus may be employed that are different from those shown without departing from the spirit and scope thereof.

We claim:

1. In a system for proportionating, mixing, pressurizing, heating and spraying a coating formulation, which formulation consists of (a) a non-compressible coating composition comprised of a high concentration of at least one solid polymer and (b) a compressible supercritical fluid as a viscosity diluent, the improvement which comprises:

a microporous membrane injector/mixer having an inlet face and an outlet face which membrane is located in said system so as to receive said non-compressible coating composition in contact with said outlet face and said compressible supercritical fluid in contact with said inlet face thereby providing a system for substantially avoiding undesirable precipitation of said solid polymer and consequential plugging of said system.

2. A system according to claim 1 wherein the outlet face of said membrane has an average pore size in the range of about 20 Angstroms to about 500 Angstroms.

3. A system according to claim 2 wherein said outlet face has an average pore size in the range of about 50 Angstroms to about 100 Angstroms.

4. A system according to claim 1 wherein the membrane material is selected from the group consisting of sintered metal and ceramic material.

5. A system according to claim 1 wherein the membrane material is sintered gamma alumina or zirconia.

6. A system according to claim 1 wherein the membrane has a graduation of pore sizes from large to small from the inlet face to the outlet face.

7. A system according to claim 1 wherein the membrane is constructed of two or more layers having progressively smaller sintered particle sizes to provide layers with finer pore sizes as the layers become closer to the outlet face.

8. A system according to claim 7 wherein the membrane is in the form of a thin tubular layer on a tubular porous support mounted in a housing having means for feeding said compressible fluid under pressure to the inlet face of said membrane.

9. A system according to claim 8 wherein the tubular porous support has a pore size of about 10,000 Angstroms and the membrane consists of an inner layer bonded to the support and having a pore size of about 1000 Angstroms and outer layer bonded to the inner layer and having a pore size of about 100 Angstroms.

10. A method which comprises:

passing a coating composition containing crystalline polymeric material into contact with the outlet face of a microporous membrane;

passing a second fluid containing a supercritical fluid and at least one non-solvent component for said crystalline polymeric material into contact with the inlet face of said microporous membrane; and pressuring said fluid to cause flow against said microporous membrane into said coating composition thereby substantially preventing the precipitation of said crystalline polymeric material when being mixed with said second fluid.

11. Method according to claim 10 wherein crystalline polymeric material is nitrocellulose and said supercritical fluid is carbon dioxide.

12. Method according to claim 10 wherein said second fluid is caused to flow on a molecular level by diffusion through said microporous membrane into said coating composition.

13. Method according to claim 10 wherein the ratio of the second fluid flow rate to the coating composition flow rate is kept at or below the solubility limit of the second fluid in the coating composition at the temperature and pressure at which the two are mixed.

14. Method according to claim 10 wherein the coating composition contains less than about 30% by weight water in the solvent fraction.

15. Method according to claim 10 wherein the components of said second fluid containing a supercritical fluid have a molecular weight of less than about 100.

16. Method according to claim 10 wherein the crystalline polymer materials have a molecular weight above about 1000.

17. Method according to claim 10 wherein the outlet face of said microporous membrane has an average pore size in the range of 40 angstroms to about 500 angstroms.

18. Method according to claim 10 wherein the supercritical fluid has a solubility of at least 10% by weight in said coating composition.

* * * * *